I. F. KEARNS.
Tinware.

No. 199,370. Patented Jan. 22, 1878.

WITNESSES:
Forde R. Smith
Raymond Bliss

INVENTOR:
Isaac F. Kearns
by Munday & Evarts
Attys.

UNITED STATES PATENT OFFICE.

ISAAC F. KEARNS, OF CHICAGO, ILLINOIS.

IMPROVEMENT IN TINWARE.

Specification forming part of Letters Patent No. 199,370, dated January 22, 1878; application filed December 26, 1877.

*To all whom it may concern:*

Be it known that I, ISAAC F. KEARNS, of Chicago, in the county of Cook and State of Illinois, have invented certain Improvements in Tinware, of which the following is a specification:

This invention relates to a method of strengthening or re-enforcing those parts of the tin vessel which are most subject to wear.

It consists in forming upon the bottom of the vessel, and of the material of said bottom, a fold, which is bent up against the bottom until it is flat, so that at the fold there are three thicknesses of metal in close contact, to resist wear at this exposed point. After being thus provided with the flattened fold the vessel is retinned, so that the crevices at the inside and outside are closed, and water excluded from the fold, so that the fold may wear through two thicknesses without causing a leak.

Figure 1:
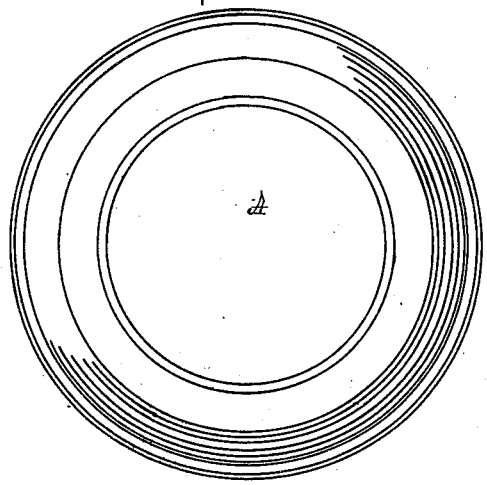
Figure 2:
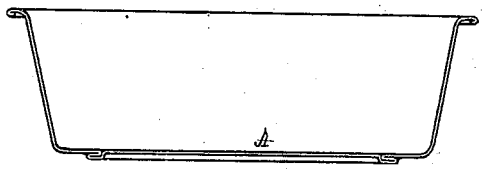
Figure 3:
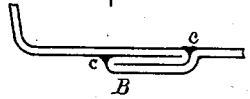
Figure 4:
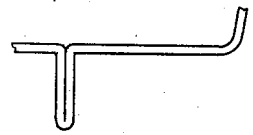

In the accompanying drawings, which form a part of this specification, Figure 1 is a bottom view of the tin pan provided with my improvement. Fig. 2 is a sectional view of the same. Fig. 3 is an enlarged section of the fold; Fig. 4, the same before folding.

In the said drawings, A represents the bottom of a stamped tin pan or vessel. Upon this bottom is formed a deep, narrow groove, opening into the pan and projecting below the bottom. This may be done by dies at the time of or subsequent to the formation of the pan. The pan in this condition is represented, so far as the groove is concerned, by Fig. 4 of the drawing. Subsequently, by the use of dies or swaging-tools, I close this groove at its lips, and bend the ledge thus formed up against the bottom, as at B, bending it, preferably, toward the outer edge of the pan, because the metal works best thus. The pan is now retinned, which fills the minute crevices $c\,c$ with tin, and guards the fold from the penetration of moisture from inside or outside.

Having thus fully described my invention, I will state that I am well aware that tin vessels have been made with a projecting ledge or annular groove at the bottom, filled with solder from the inside, to serve as a protection from wear; and I do not claim such as my invention.

What I claim as new, and desire to secure by Letters Patent, is—

The vessel of tinware, formed with a fold, B, in the metal of the bottom, to serve as a re-enforcement against wear, substantially as specified.

ISAAC F. KEARNS.

Witnesses:
JOHN W. MUNDAY,
FORDE R. SMITH.